(12) United States Patent
Yang et al.

(10) Patent No.: US 6,461,762 B1
(45) Date of Patent: Oct. 8, 2002

(54) RECHARGEABLE BATTERY STRUCTURE HAVING A STACKED STRUCTURE OF SEQUENTIALLY FOLDED CELLS

(75) Inventors: Chang-Rung Yang, Tai-Ping; Yih-Song Jan, Taipei, both of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/556,902

(22) Filed: Apr. 20, 2000

(51) Int. Cl.[7] .............................. H01M 6/10; H01M 6/46
(52) U.S. Cl. ..................... 429/127; 429/153; 429/162
(58) Field of Search .................. 429/127, 152, 429/153, 162, 149, 94

(56) References Cited

U.S. PATENT DOCUMENTS 5,498,489 A * 3/1996 Dasgupta et al.
5,911,947 A * 6/1999 Mitchell
5,989,743 A * 11/1999 Yamashita

* cited by examiner

*Primary Examiner*—Patrick Ryan
*Assistant Examiner*—Susy Tsang-Foster
(74) *Attorney, Agent, or Firm*—W. Wayne Liauh

(57) ABSTRACT

This specification discloses a rechargeable battery structure and the method of making the same. The battery comprises a stacked structure suitable for rectangular batteries by an S-shape sequential folding so as to increase the energy density and the charge/discharge cycle of the battery while lowering the safety worry about filling too much electrolyte. The feature of a stacked battery structure is that no active material of the positive and negative electrodes is coated at folded corners. The folded corner is also glued to make a thinner battery cell after squeezing under pressure. This folded cell is further under the application of heat and pressure and put into a rectangular battery case made of metal or aluminum foil. A new battery structure is thus obtained after filling electrolyte and encapsulation.

10 Claims, 6 Drawing Sheets

RECHARGEABLE BATTERY STRUCTURE HAVING A STACKED STRUCTURE OF SEQUENTIALLY FOLDED CELLS

BACKGROUND OF THE INVENTION

1. Field of Invention

The present invention relates to a rechargeable battery structure and the method of making the same and, in particular, to a rechargeable battery structure adopting S-shape folding on the electrolytic cells and the method of making the same.

2. Related Art

Recent developments in rechargeable secondary power storage devices, such as the lithium-ion secondary battery, the high efficiency nickel hydrogen battery, and the super capacitor, are becoming mature; there are good performances in energy density, power density and battery lifetime. As electronic elements get miniaturized, the weight and volume of the battery is also forced to minimize. However, in this miniaturizing process, the energy capacity and lifetime of the battery are only allowed to increase but not to decrease. Furthermore, the safety concern is still the primary consideration. Thus, there is still need for a new movable energy source.

Usual batteries can be classified into two types: the cylindrical type and the rectangular type. The 3C battery module uses mostly the rectangular type batteries because they are more effective in space. Conventional rectangular battery cell elements are rolled into a spiral coil, resulting in certain die volume (usually on the four corners) in the battery. This die volume is filled with electrolyte; so it causes the loss in energy density and lowers the cycle lifetime of the battery. More seriously, there are safety concerns about possible electrolyte leakage.

SUMMARY OF THE INVENTION

In view of the foregoing, it is an object of the present invention to provide a new rechargeable battery structure, which is a stacked structure of sequentially folded cells that can increase the energy density while decreasing die volume of the battery.

The rechargeable battery structure according to the above object of the invention comprises a plurality of flexible electrolytic electrode layers and interposed electrolytic material arranged by sequential folding. wherein the positive and negative electrodes comprise a current collector coated with cathode and anode active materials, respectively. The structure is characterized in that (a) the electrolytic cell layer is a stacked cell structure formed by S-shape folding; and (b) the cathode and anode active materials are coated at intervals on the current collector by interposition and no cathode and anode active materials are coated at folded places.

Furthermore, the present invention provides a method of making the rechargeable battery of the above-mentioned stacked structure.

Pursuant to the above object, the method of making the rechargeable battery comprises the steps of: (a) providing a flexible electrolytic cell layer, which comprises a plurality of pairs of positive and negative electrodes for chemical reactions and interposed electrolytic material, and the positive and negative electrodes including cathode and anode active materials coated at intervals on two current collectors, respectively; (b) folding the electrolytic cell layer at the places where no cathode and anode active materials are coated so as to get a stacked cell structure of electrolytic cells stacked successively; (c) squeezing the stacked cell structure by pressure and putting it into a battery case; and (d) filling electrolyte and encapsulating.

Since this new battery structure takes the sequential S-shape folding, the gas pressure generated around the electrodes due to improper operation, such as charging or short-circuiting, would not accumulate in concentric circles but expand toward both ends of the electrodes. Therefore, this structure design of the electrodes satisfies the safety requirement. Furthermore, since folding is employed, the volume usage rate is greatly increased. No excess electrolyte is supplied due to too much die volume. Therefore, in addition to the increase in the energy density and the charge/discharge cycle lifetime, this structure also significantly eases the safety worry about too much electrolyte. In the aspect of the battery thickness, the lithium ion rectangular battery utilizes a blade or a diamond tool to spiral the cell to obtain a thinner battery structure. Although 3 mm can be reached in principle, the current ones have a thickness of about 4.5 mm to 8 mm. The new design of the battery structure can have a thickness below 2 mm done without using any tool.

Since the battery structure of the invention takes the rectangular shape, it has a superior heat ventilation mechanism. Therefore, the invention is suitable for applications requiring large batteries such as the electric vehicle. This structure can then replace large cylindrical vehicle batteries currently used.

Current lithium ion secondary batteries comprises organic electrolyte in conjunction with the anode material, such as $LiCoO_2$, $LiMn_2O_4$, $LiNiO_2$, or $LiCo_xNi_{(1-x)}O_2$, where x is a fractional number between 0 and 1, and the cathode material, such as graphite, carbon, MCMB, and lithium. Also, a separator membrane must be provided between positive and negative electrodes to prevent short-circuiting. The organic electrolyte is permeated between porous plasticized separator membranes for ionic conduction. Since the electrolyte is a liquid, a metal case has to be employed for the sake of safety. The drawback is that metal cases can not be fabricated too thin. Moreover, the aluminum foils used in polymeric batteries are cheaper in cost. Therefore, the lithium ion battery with the new battery structure of the invention must be superior in both thickness and cost.

For the most part, the sequential folding structure disclosed in the present invention can provide features such as a higher safety, higher energy density, higher cycle lifetime and good conductivity at a high temperature.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow by illustration only, and thus is not limitative of the present invention, and wherein.

DETAILED DESCRIPTION OF THE INVENTION

Figure 1:
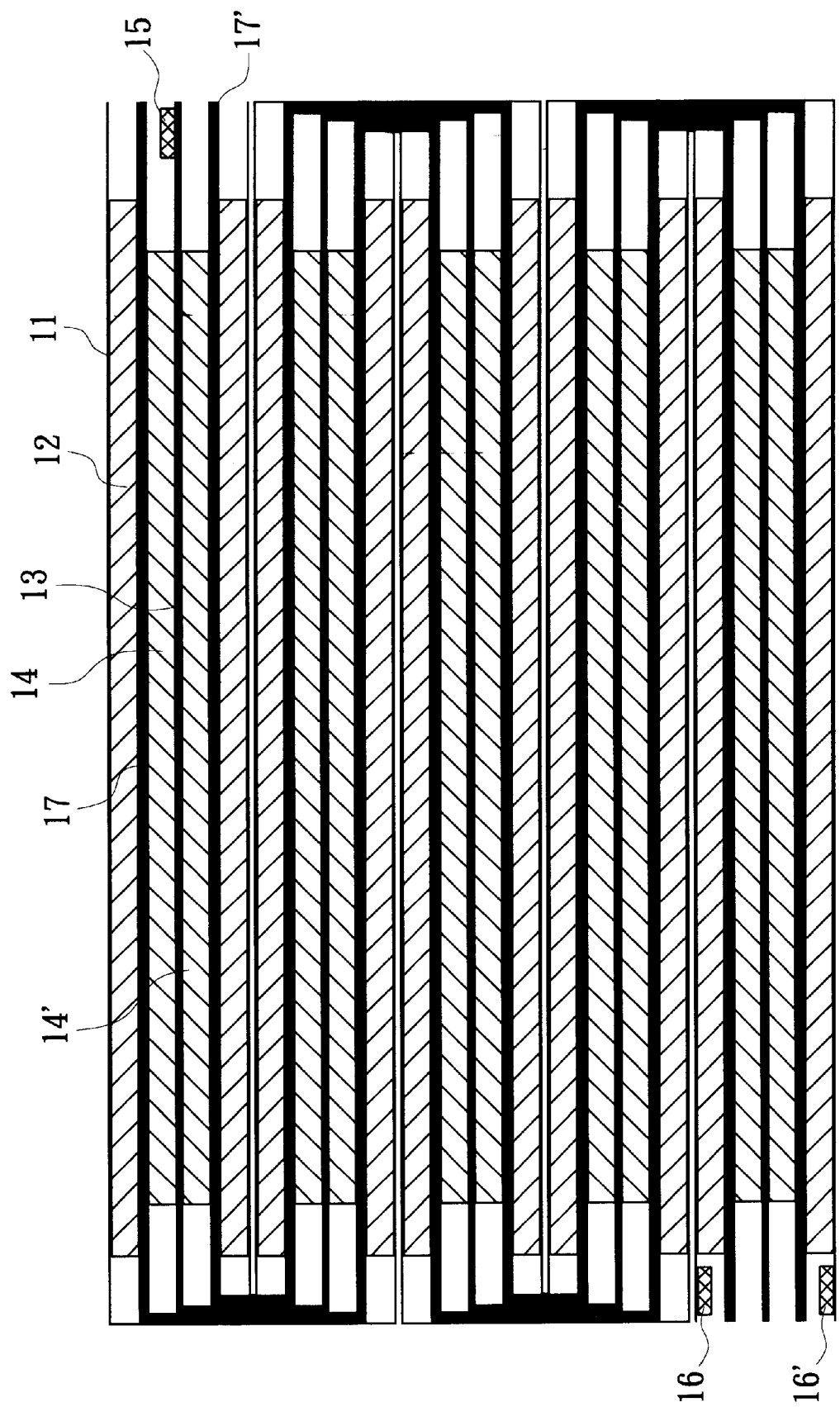
FIG. 1 is a schematic view of the stacked battery cell structure through sequential folding according to the present invention.
Figure 2:
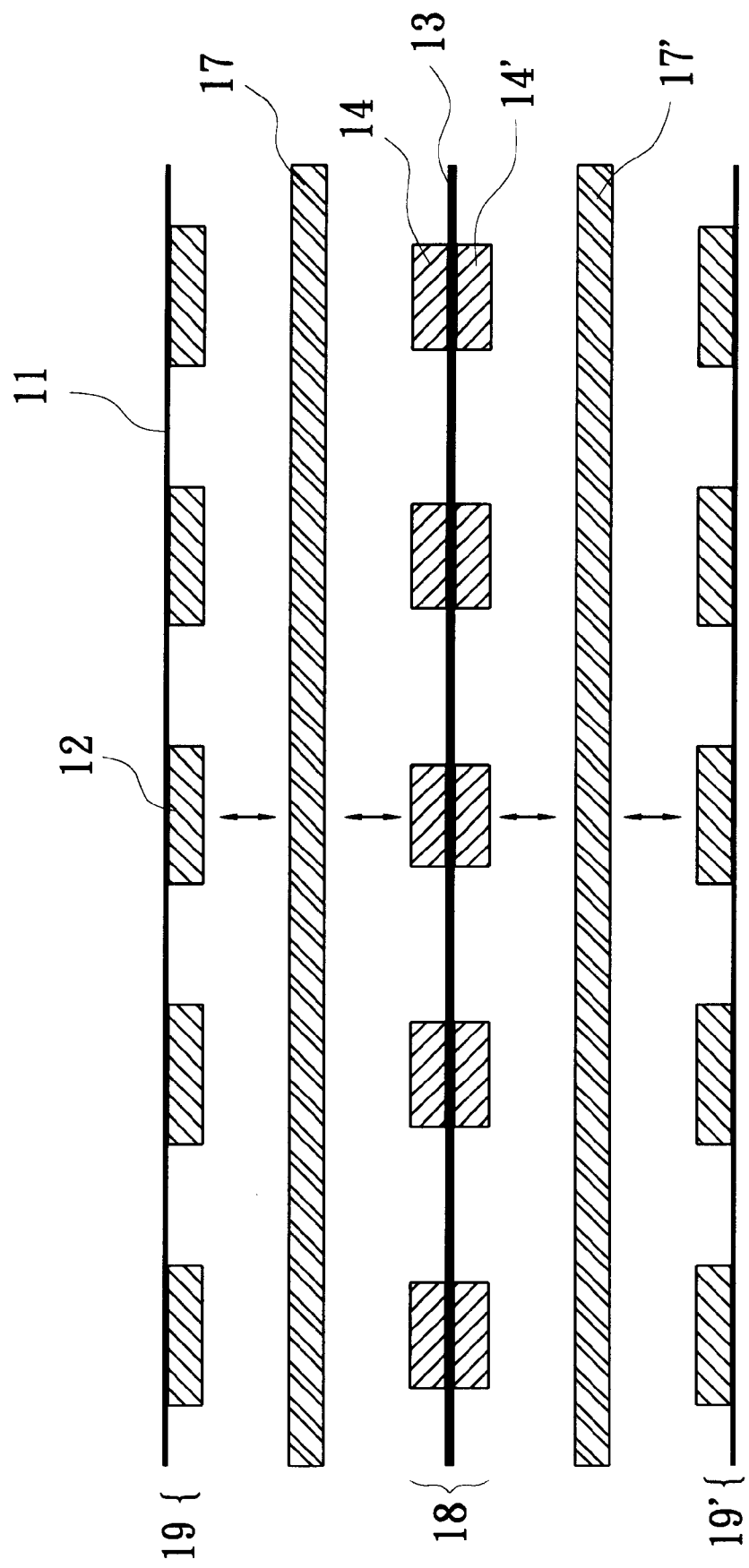
FIG. 2 depicts the positive and negative electrode coils comprised in the folded battery structure of the present invention.

FIG. 1 is a schematic view of the new stacked battery cell structure according to the present invention. FIG. 2 depicts the positive and negative electrode coils comprised in the folded battery structure shown in FIG. 1. For illustration's purposes, the size in both diagrams is not drawn to scale.

The new battery structure shown in the drawing comprises a positive electrode 18, a negative electrode 19, 19', and electrolytic material 17, 17'. The positive electrode 18 comprises a cathode material layer 14, 14' and a current collector 13 made of foils of metals such as copper, aluminum, or nickel. The cathode material layer 14 comprises active materials such as $LiCoO_2$, $LiMn_2O_4$, $LiNiO_2$, and $LiCo_xNi_{(1-x)}O_2$ mixed with conducting powders such as graphite or acetylene black and polyvinylidene fluoride (PVDF). The negative electrode 19, 19' comprises an anode material layer 12 and a current collector 11 made of foils, meshes, or plates of metals such as copper, aluminum, or nickel. The anode material layer 12 comprises carbonic material such as graphite, carbon, mesocarbon microbeads (MCMB) mixed with PVDF. The electrolytic material 17, 17' includes polymeric separator membrane and electrolyte.

Manufacture of Positive Electrodes:

In a preferred embodiment, the positive electrode (cathode) serum comprises 80% to 95% of $LiCoO_2$ (made by Nippon Chemical), 3% to 15% of acetylene black (ks6, made by Lonza), and 3% to 10% of PVDF (made by Kureha) dissolved in the solvent NMP (N-methyl-2-pyrrolidone, made by Mitsubishi Chemical). The formed ink-like serum is coated onto the top and bottom surfaces of an aluminum coil that is 300 m long, 35 cm wide, and 20 $\mu$m thick. The serum is coated at intervals and symmetrically. That is, not the whole aluminum foil surfaces are coated. The cross section is shown as in FIG. 2, wherein 13 is the aluminum foil current collector, 14, 14' are the mixture of anode active materials, namely, the cathode material, with a length $L_1=40$ mm, a spacing $L_2=4.5$ mm. The anode coil after drying needs to be pressed and striped into stripes with a width (perpendicular to the paper surface) of 68 mm. Finally, it is put into a vacuum at 110° C. and get dried for 4 hours.

Manufacture of Negative Electrodes:

In a preferred embodiment of the present invention, the negative electrode (anode) serum comprises 90% of MCMB powders with diameters ranging from 1 $\mu$m to 30 $\mu$m (made by Osaka Gas) dissolved in a solvent consisting of 10% of PVDF (Kureha, 1000) and NMP (made by Mitsubishi Chemical). After stirring into homogeneity, the serum is coated onto a copper foil coil that is 300 m long, 35 cm wide, and 10 $\mu$m thick in the way shown in FIG. 2, wherein 11 is the copper foil and 12 is the cathode active material, namely, the anode material layer. The negative electrode coil thus formed is further pressed and striped into stripes with a width of 70 mm. Similarly, the negative electrode is put into a vacuum at 110° C. and get dried for 4 hours.

Figure 3:
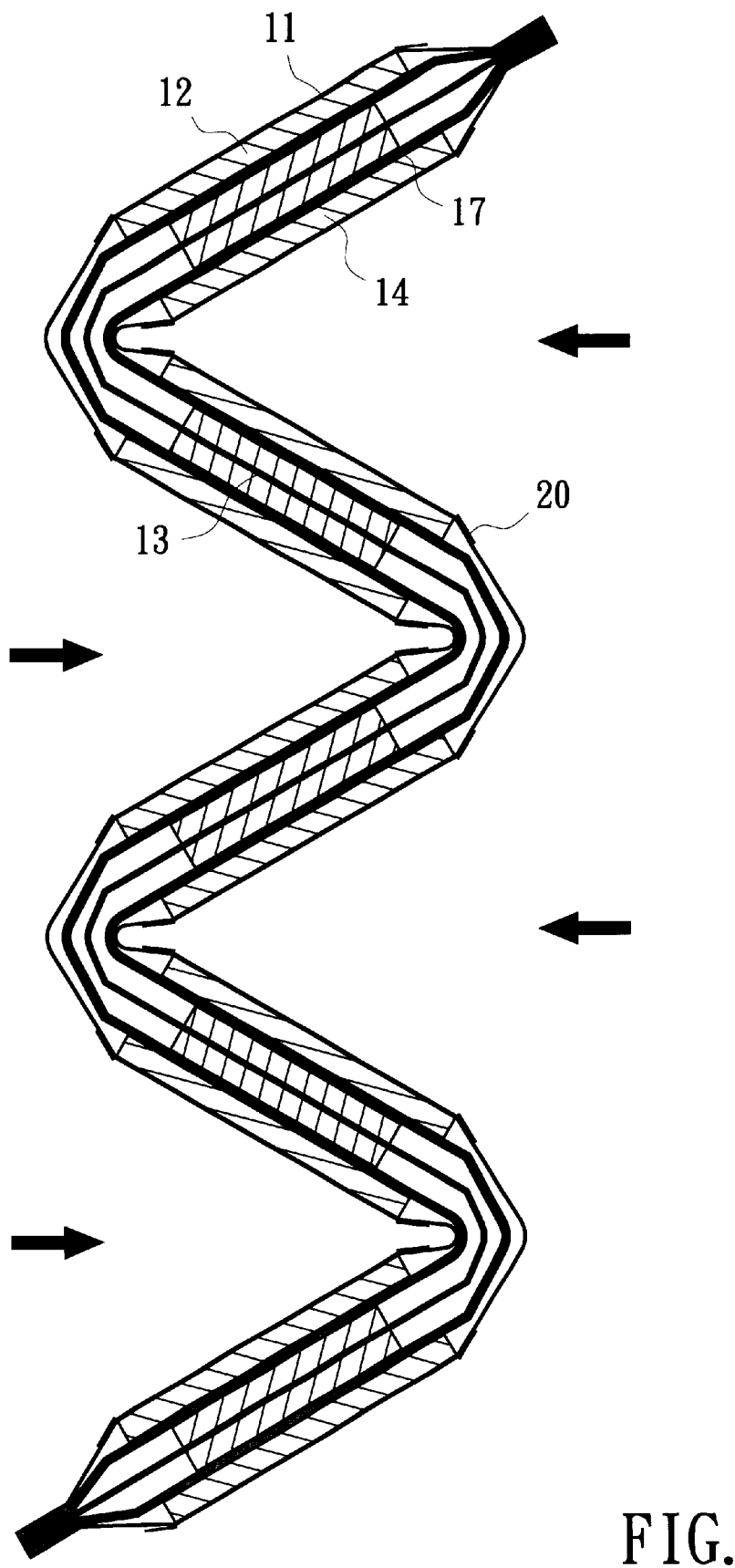
FIG. 3 shows the folding done to the material in FIG. 2.
Figure 4:
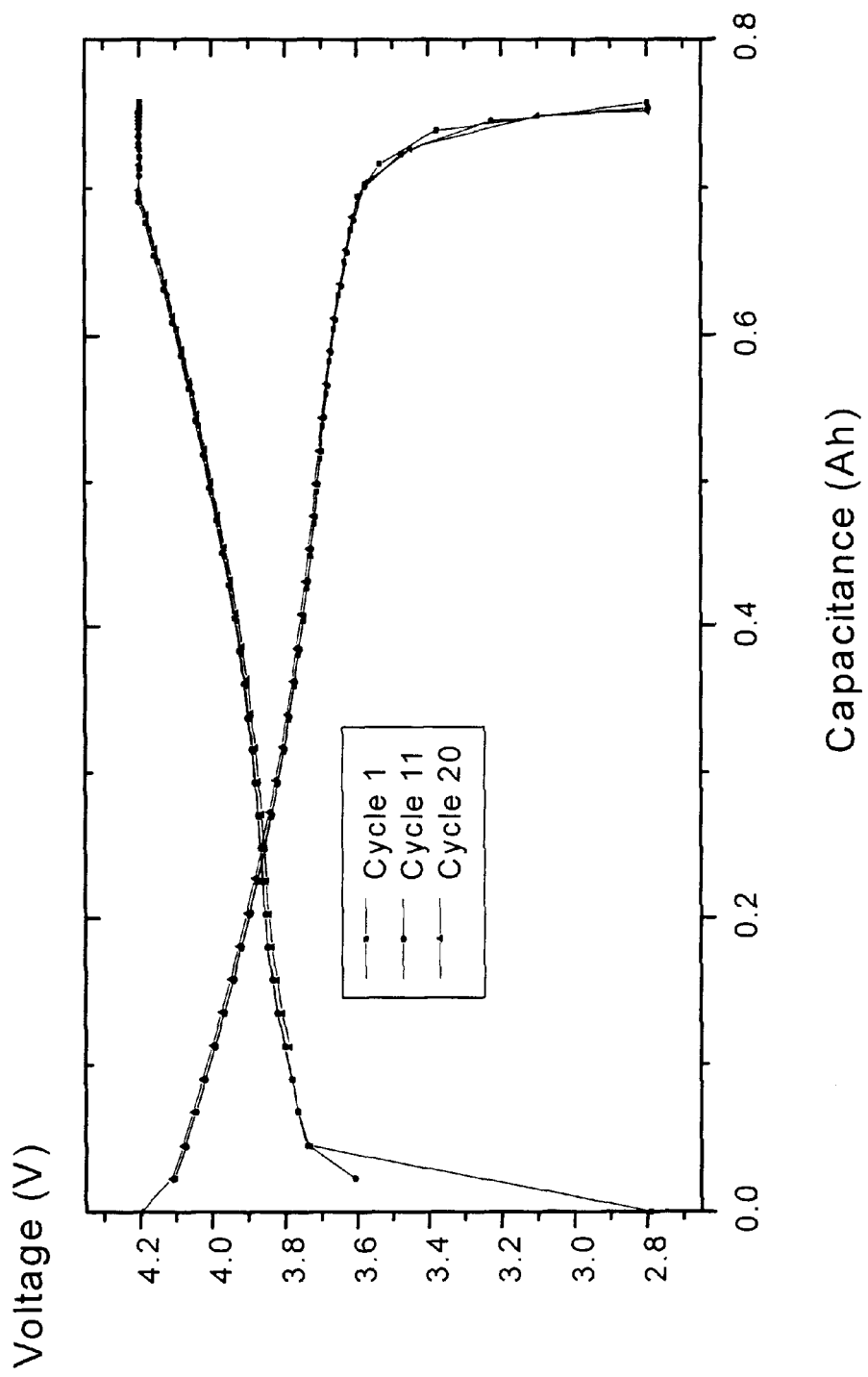
FIG. 4 is a diagram showing the charge/discharge efficiency of the battery in FIG. 1.

Battery Assembly:

The positive and negative electrodes 18, 19, 19' after preparing are cut into successively five cathode materials 14, 14' and anode materials 12. They are positive and negative electrode elements processed through vacuum and drying treatments and placed in a dry environment such as a glove box or a dry room. They are disposed as shown in FIG. 2, with two of the above negative electrodes 19, 19' and a positive electrode sandwiched in between. The electrolytic material 17, 17' in FIG. 2 comprises polymeric separator membrane and electrolyte filled therein. The polymeric electrolytic membrane, such as PCDF-HEP (polychlorodibenzofuran-hexafluoro-polymer) (Solvay), PP (polypropylene) or PE (polyethylene) separator membrane (Celgard), is inserted between each pair of negative electrode 19 (or 19') and positive electrode 18 and glued together by interposition. After assembling these elements (19, 17, 18, 17', 19'), the structure is sequentially folded according to the S shapedshape shown in FIG. 3. The folding is done at those places where no cathode or anode materials 14, 14', 12 are coated and the structure in FIG. 1 is formed. FIG. 3 is not drawn to scale as well. Therefore, no acute angle is formed at the folded edges in practical manufacturing. Since there is not too much difference in the lengths of the inner arc and outer arc at folded places, no special contraposition is needed. However, when combining the stacked cell structure of FIG. 3, the polymeric glue 20, such as epoxy, can be applied at folded places for gluing and fixing. It does not participate the battery charge/discharge reaction. Finally, squeezing is performed from top and bottom on the folded structure to form a battery structure that is 4 mm thick, 7 mm long, and 4.3 mm wide. This structure is further under heat and pressure on top and bottom at 150 for 5 minutes. After formation, this new battery structure is put into a rectangular metal or aluminum foil case for final electrolyte filling and encapsulation. For example, the battery is put into an aluminum foil bag where vacuum is produced. The MEX2 electrolyte (made by Tomiyamaical) is filled into the bag and the aluminum foil bag is then closed. This completes the whole fabrication of the new battery structure. In FIG. 1, a positive electrode conducting aluminum plate 15 and a negative electrode conducting nickel plate 16, 16' are inserted. After experimental testing, the charge/discharge property of the fabricated rectangular battery is shown in FIG. 4.

Figure 5:
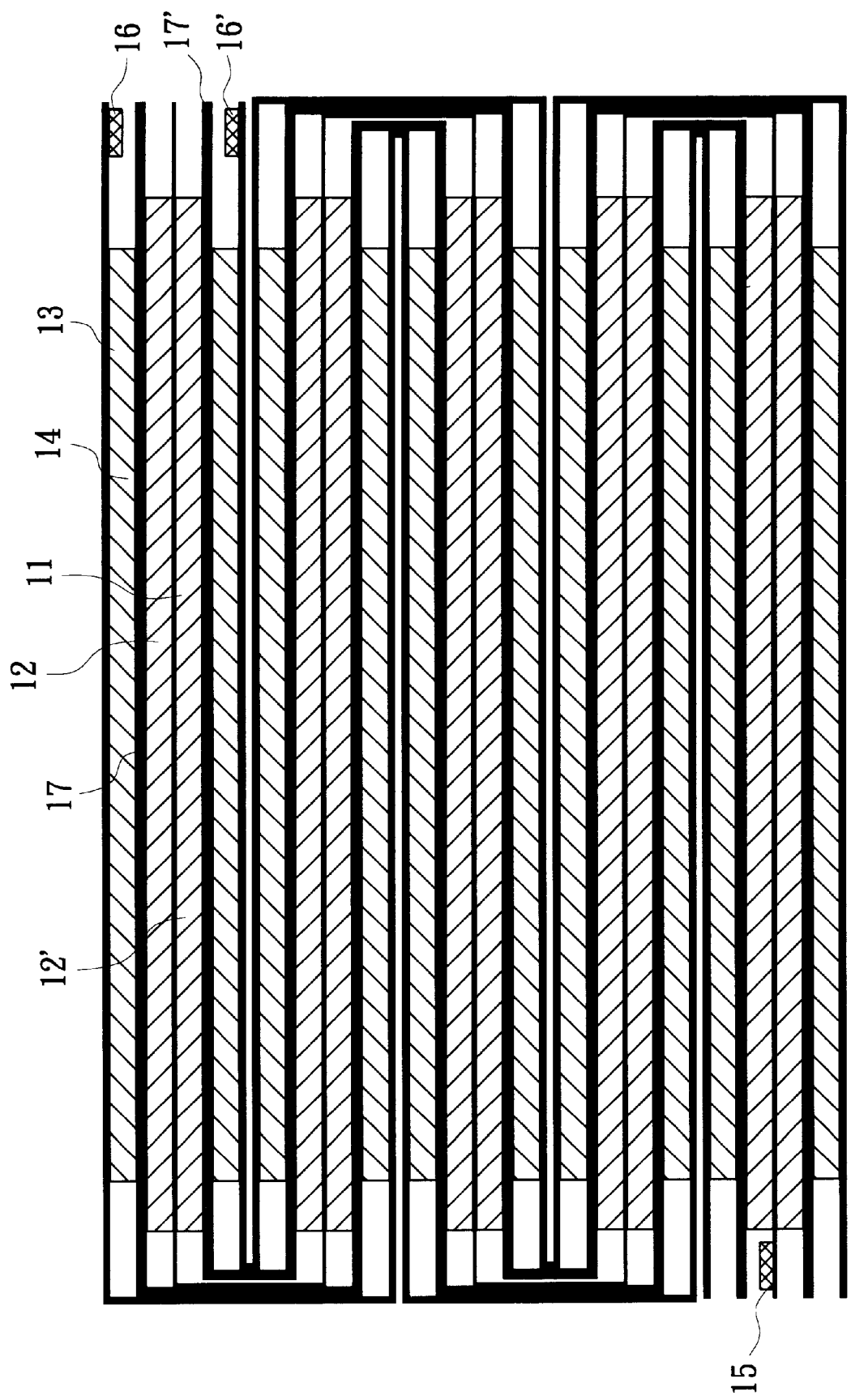
FIG. 5 is a schematic view of the stacked battery cell structure according to another preferred embodiment of the present invention.

In another preferred embodiment shown in FIG. 5, the positions of the positive and negative electrodes can be exchanged. That is, the negative electrode 19 is coated with anode material layers 12 at intervals on both surfaces and placed in the middle. Two positive electrodes 18 coated with a cathode material layer at intervals on one surface are disposed on the top and bottom sides of the cathode material layers 14 so that the cathode material layers 14 are opposite to the anode material layers 12, 12'. Similarly, two electrolytic materials 17, 17' are inserted between the positive electrode 18 and the negative electrode 19. After folding, a stacked structure of the cell in FIG. 5 is obtained.

Figure 6:
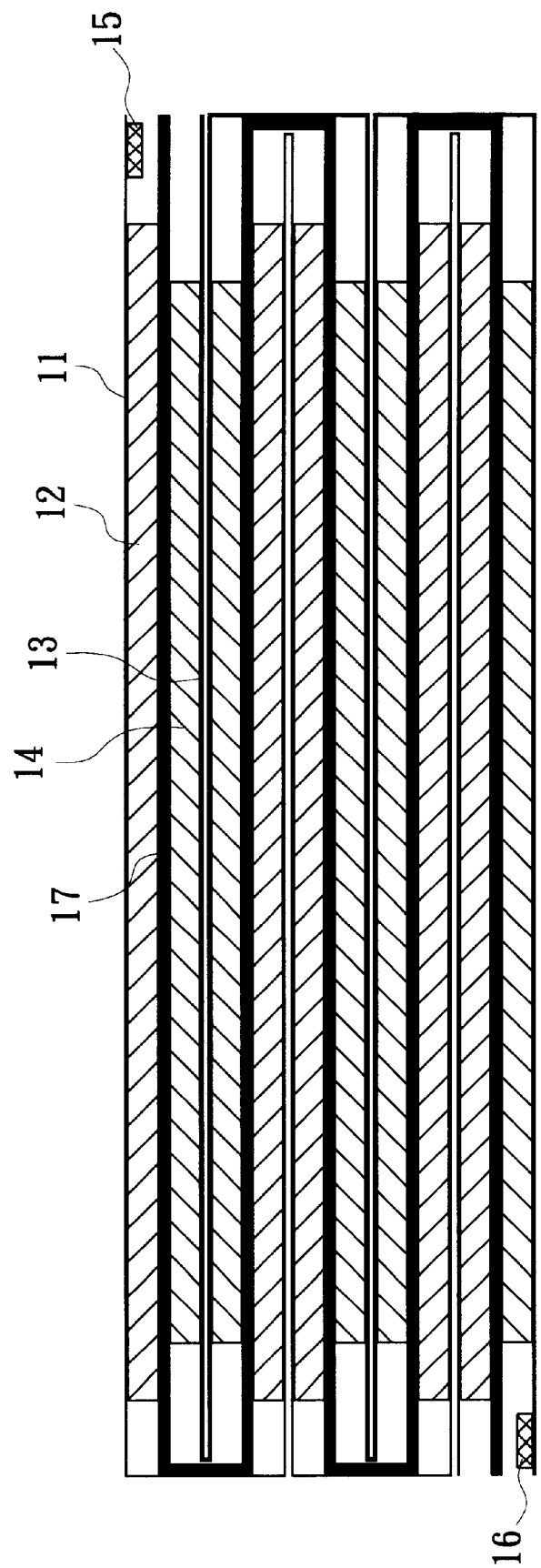
FIG. 6 is a schematic view of the stacked battery cell structure according to yet another preferred embodiment of the present invention.

Yet, in another preferred embodiment shown in FIG. 6, only a single positive electrode and a single negative electrode are combined together. That is, both the positive electrode 18 and the negative electrode 19 are coated at intervals on one surface only. While combining, the cathode material layer 14 is opposite to the anode material layer 12 with interposed electrolytic material 17. After folding, a stacked structure of the cell in FIG. 6 is obtained.

In yet another embodiment, the cathode active material can be mixed with conducting powders and glue for coating on the current collector, and the anode active material can be mixed with glue for coating on the current collector.

The invention being thus described, it will be obvious that the same may be varied in many ways. Such variations are not to be regarded as a departure from the spirit and scope of the invention. and all such modifications as would be obvious to one skilled in the art are intended to be included within the scope of the following claims.

What is claimed is:

1. A rechargeable battery comprising:

a flexible electrolytic cell layer which comprises a plurality of flexible positive and negative electrodes interposed by electrolytic material, wherein the positive and negative electrodes comprise a current collector coated with a cathode and anode active material, respectively;

the electrolytic cell layer is folded into an S shape to form a stacked cell structure;

the cathode and anode active material are each coated at intervals on the current collectors except for the folded places, and wherein a glue is applied at folded places on the electrolytic cell layer for gluing together contacted parts while stacking.

2. The battery of claim 1, wherein the electrolytic cell layer comprises a pair of the positive and negative electrodes for electrochemical reactions.

3. The battery of claim 1, wherein the electrolytic cell layer comprises:

a first current collector, which is coated at intervals with the cathode active material on both surfaces to form the positive electrode; and two second current collectors, each of which is coated at intervals with the anode active material on one surface to form a pair of negative electrodes;

wherein the negative electrodes are disposed on both sides of the positive electrode with the cathode active material being opposite to the anode active material, and two electrolytic materials are inserted between the cathode and anode active material as separators.

4. The battery of claim 1, wherein the electrolytic cell layer comprises:

a first current collector, which is coated at intervals with the anode active material on both surfaces to form the negative electrode; and two second current collectors, each of which is coated at intervals with the cathode active material on one surface to form a pair of positive electrodes;

wherein the positive electrodes are disposed on both sides of the negative electrode with the cathode active material being opposite to the anode active material, and two electrolytic materials are inserted between the cathode and anode active material as separators.

5. The battery of claim 1, wherein the cathode active material is selected from the group consisting of $LiCoO_2$, $LiMn_2O_4$, $LiNiO_2$, and $LiCo_xNi_{(1-x)}O_2$ where x is a fractional number between 0 and 1.

6. The battery of claim 1, wherein the anode active material is selected from the group consisting of graphite, carbon, and mesocarbon microbeads (MCMBs).

7. The battery of claim 1, wherein the cathode active material is mixed with conducting powders and glue for coating on the current collector.

8. The battery of claim 1, wherein the electrolytic material comprises a separator membrane and electrolyte filled therein.

9. The battery of claim 1, wherein the anode active material is mixed with glue for coating on the current collector.

10. The battery of claim 1, wherein the glue is a polymeric epoxy.

* * * * *